(12) United States Patent
Wong et al.

(10) Patent No.: US 7,876,792 B2
(45) Date of Patent: Jan. 25, 2011

(54) NETWORK ELEMENT CLOCKING ACCURACY AND STABILITY MONITORING OVER A PACKET-SWITCHED NETWORK

(75) Inventors: Kin Yee Wong, Ottawa (CA); Peter Roberts, Stittsville (CA)

(73) Assignee: Alcatel Lucent, Paris (FR)

( * ) Notice: Subject to any disclaimer, the term of this patent is extended or adjusted under 35 U.S.C. 154(b) by 126 days.

(21) Appl. No.: 12/263,111

(22) Filed: Oct. 31, 2008

(65) Prior Publication Data

US 2010/0111113 A1 May 6, 2010

(51) Int. Cl.
*G06F 15/16* (2006.01)
*H04J 3/06* (2006.01)
*G01R 31/08* (2006.01)

(52) U.S. Cl. .................. 370/518; 709/224; 370/241
(58) Field of Classification Search .......... 370/351, 370/312, 313, 314, 350, 503, 507, 509, 511, 370/517, 518, 241, 242; 709/203, 208, 210, 709/219, 220, 224, 225, 232
See application file for complete search history.

(56) References Cited

U.S. PATENT DOCUMENTS

| | | | |
|---|---|---|---|
| 6,351,821 B1 * | 2/2002 | Voth | 713/600 |
| 7,583,705 B2 * | 9/2009 | Sinha et al. | 370/503 |
| 7,613,212 B1 * | 11/2009 | Raz et al. | 370/510 |
| 7,688,862 B2 * | 3/2010 | Wisler | 370/503 |
| 7,697,495 B2 * | 4/2010 | Armstrong et al. | 370/338 |

\* cited by examiner

*Primary Examiner*—Hanh Nguyen
(74) *Attorney, Agent, or Firm*—Kramer & Amado PC (57) ABSTRACT

Various exemplary embodiments include a method and related system and monitoring entity including one or more of the following: generating timing information at a master node in a packet-switched network, the timing information specifying a value of a master clock; communicating the timing information from the master node to a plurality of slave nodes over a first plurality of time-division multiplexing (TDM) pseudowires; running a digital phase-locked loop on each slave node to synchronize each slave node to the master clock, wherein each digital phase-locked loop outputs a frequency at which the respective slave node is operating; sending the frequency outputted by each digital phase-locked loop to a monitoring entity over a second plurality of TDM pseudowires; utilizing the outputted frequencies at the monitoring entity to identify all slave nodes that are experiencing timing problems; and implementing a remedial measure for all slave nodes that are experiencing timing problems.

22 Claims, 4 Drawing Sheets

NETWORK ELEMENT CLOCKING ACCURACY AND STABILITY MONITORING OVER A PACKET-SWITCHED NETWORK

TECHNICAL FIELD

Various exemplary embodiments relate generally to emulation of time-division multiplexing in a packet-switched network and, more particularly, to monitoring timing information exchanged via packets over such a network.

BACKGROUND

In many conventional computer networks, a connection between two nodes includes only a single transmission medium. Time-division multiplexing (TDM) combines multiple data streams into one signal, thereby allowing the data streams to share the single transmission medium. More specifically, as its name suggests, TDM divides the signal into a number of segments, each constituting a fixed length of time. Because the sending node assigns data to the segments in a rotating, repeating sequence, the receiving node may reliably separate the data streams at the other end of the transmission medium.

With the rapid development of modern packet-switched networks, TDM-based protocols such as Synchronous Optical Networking (SONET) have gradually fallen out of favor as a preferred technology and have been widely replaced by packet-based protocols, which transmit data over less expensive Ethernet links. For example, Voice-Over-Internet Protocol (VoIP) services have replaced many TDM-based services, given VoIP's flexibility, ease of implementation, and reduction in costs. Unfortunately, transitioning to packet-based protocols requires a service provider to incur significant expenses in expanding its infrastructure and replacing customer premises equipment.

Given the large initial investment, many service providers have been reluctant to make the transition from TDM-based services to corresponding services in packet-switched networks. TDM pseudowires allow service providers to gradually make the transition to packet-switched networks, eliminating the need to replace TDM-based equipment and drop support of legacy services. In particular, on the ingress end of a TDM pseudowire, a network element converts the TDM signals into a plurality of packets, then sends the packets across a packet-based path, or pseudowire. Upon receipt of the packets, a network element on the egress end converts the packets back into TDM signals and forwards the TDM signals towards their ultimate destination.

Although TDM pseudowires offer flexibility and reduce expenses, they also introduce problems specific to packet-switched networks. Unlike TDM connections, packet-switched networks are not designed for network-wide synchronization of nodes. Thus, although pseudowires can exchange timing information using packets, the inherent characteristics of the packet-switched network affect the accuracy and reliability of the synchronization. For example, unlike circuit-switched networks, packet-switched networks use variable paths with a variable bit rate, such that timing packets may arrive at nodes at varying intervals or may not arrive at all, thereby affecting the synchronization of the nodes.

Given these problems, many service providers express considerable skepticism regarding the viability of switching their TDM circuits onto packet-based services that emulate such circuits. One reason for such skepticism is the lack of a reliable mechanism for monitoring the synchronization of the nodes in the packet-switched network. More specifically, there is currently no known solution that allows service providers to reliably and efficiently monitor the timing information used by nodes that emulate TDM services in a packet-switched network.

For the foregoing reasons and for further reasons that will be apparent to those of skill in the art upon reading and understanding this specification, there is a need for a mechanism that reliably and efficiently monitors the timing information used by nodes that emulate TDM services in a packet-switched network.

SUMMARY

In light of the present need for monitoring of timing information used by nodes that emulate TDM services in a packet-switched network, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

In various exemplary embodiments, a method for monitoring timing information for packet-based services comprises one or more of the following steps: generating timing information at a master node in a packet-switched network, the timing information specifying a value of a master clock; communicating the timing information from the master node to a plurality of slave nodes over a first plurality of time-division multiplexing (TDM) pseudowires; running a digital phase-locked loop on each slave node to synchronize each slave node to the master clock, wherein each digital phase-locked loop outputs a frequency at which the respective slave node is operating; sending the frequency outputted by each digital phase-locked loop to a monitoring entity over a second plurality of TDM pseudowires; utilizing the outputted frequencies at the monitoring entity to identify all slave nodes that are experiencing timing problems; and implementing a remedial measure for all slave nodes that are experiencing timing problems.

In various exemplary embodiments, the monitoring entity is the master node, such that the first plurality of TDM pseudowires is the same as the second plurality of TDM pseudowires.

In various exemplary embodiments, the method further comprises one or more of the following steps: inputting the outputted frequency for each slave node into one of a plurality of digital phase-locked loops running on the monitoring entity, wherein each loop corresponds to one of the plurality of slave nodes; determining, for each of the plurality of digital phase-locked loops, a parameter used to adjust a digitally-controlled oscillator of each of the plurality of loops, wherein an input into each digitally-controlled oscillator is a common oscillator shared by each of the plurality of the loops; analyzing each parameter to identify all parameters that are outside of an acceptable range; and for each parameter outside of the acceptable range, identifying the slave node corresponding to the parameter as experiencing timing problems.

Furthermore, in various exemplary embodiments, the method may further comprise: running a reference phase-locked loop that shares the common oscillator and receives, as input, a reference frequency known to be accurate; setting a reference parameter equal to a value of a parameter used to adjust a digitally-controlled oscillator in the reference phase-locked loop, the digitally-controlled oscillator in the reference phase-locked loop receiving, as input, the common oscillator; and comparing each parameter associated with a slave node to the reference parameter to identify all parameters that are outside of the acceptable range.

In various exemplary embodiments, the sub-step of analyzing each parameter comprises performing statistical analysis to identify all parameters that are statistical outliers using at least one of a mean of all parameters and a standard deviation for each parameter. In addition, each parameter may be an offset value used to adjust the frequency output of the digitally-controlled oscillator.

Furthermore, in various exemplary embodiments, the remedial measure comprises notifying a network operator of all slave nodes that are experiencing timing problems or, for each slave node that is experiencing timing problems, selecting a new master node from which the slave node should receive timing information.

In addition, various exemplary embodiments provide a related system for monitoring timing information for packet-based services, the system including a master node, a plurality of slave nodes, and a monitoring entity. Each of the elements of this system may be configured to perform one or more of the functions mentioned above or other functions that will be apparent based upon an understanding of the detailed description provided herein.

Finally, various exemplary embodiments provide a related monitoring entity for monitoring timing information exchanged between nodes in a packet-switched network, the node comprising a receiver configured to receive packets from a plurality of slave nodes, the packets specifying an operating frequency of each slave node, wherein each slave node sets the operating frequency using timing information received from a master node; a plurality of digital phase-locked loops that share a common oscillator, one for each slave node, wherein each of the plurality of digital phase-locked loops receives, as input, the outputted frequency from the corresponding slave node, and each of the plurality of digital phase-locked loops tunes an operating frequency of the loop to the outputted frequency from the corresponding slave node by adjusting a parameter associated with the a digitally-controlled oscillator in each loop; and a statistical analysis module that analyzes each parameter to identify all parameters that are outside of an acceptable range and, for each parameter outside of the acceptable range, identifies the corresponding slave node as experiencing timing problems.

BRIEF DESCRIPTION OF THE DRAWINGS

In order to better understand the various exemplary embodiments, reference is made to the accompanying drawings, wherein.

DETAILED DESCRIPTION

Referring now to the drawings, in which like numerals refer to like components or steps, there are disclosed broad aspects of various exemplary embodiments.

Figure 1:
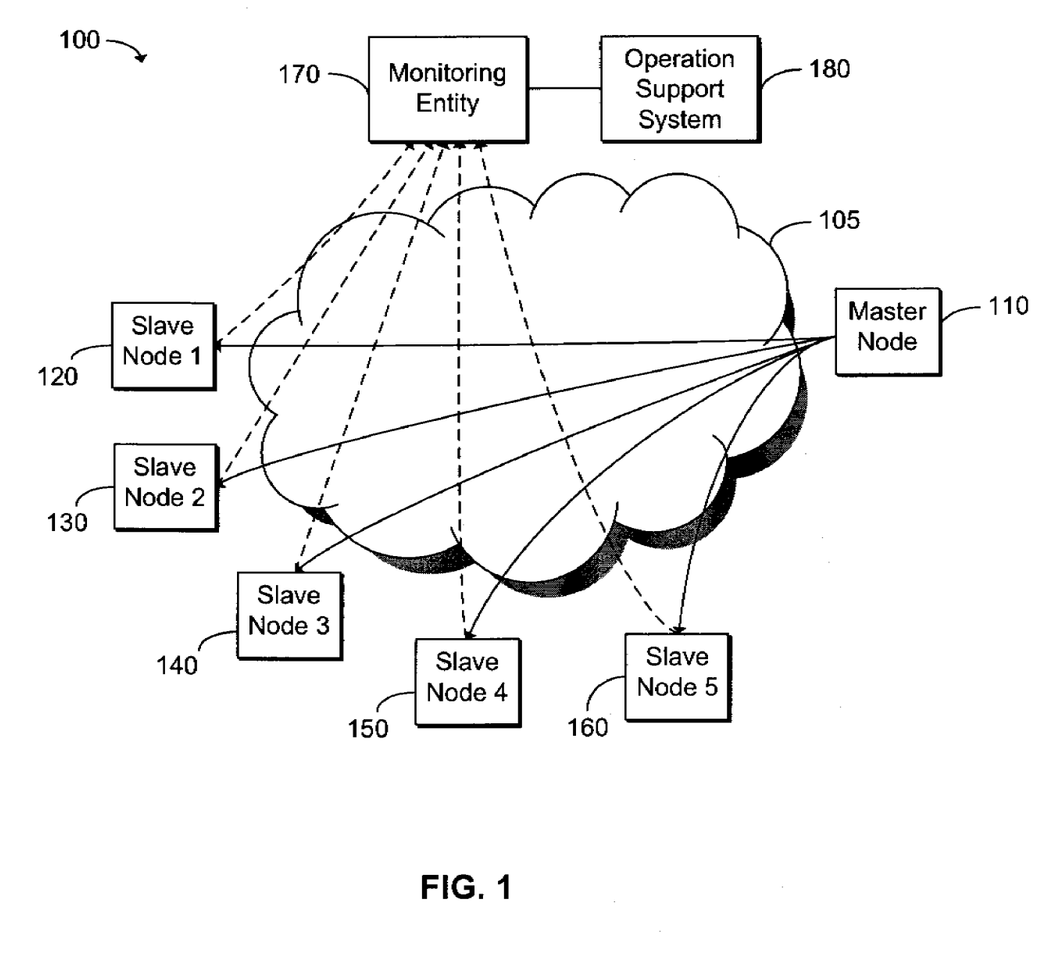
FIG. 1 is a schematic diagram of an exemplary system for monitoring timing information for packet-based services.

FIG. 1 is a schematic diagram of an exemplary system 100 for monitoring timing information for packet-based services. Exemplary system 100 includes packet-switched network 105, master node 110, slave node 1 120, slave node 2 130, slave node 3 140, slave node 4 150, slave node 5 160, common timing reference (CTR) node 170, and operation support system 180.

Packet-switched network 105 may be any network operating in accordance with a packet-based protocol. Thus, network 105 may operate, for example, according to Transmission Control Protocol/Internet Protocol (TCP/IP), Multi Protocol Label Switching (MPLS), Ethernet, Provider Backbone Transport (PBT), or any other suitable packet-based protocol that will be apparent to those of skill in the art.

In various exemplary embodiments, master node 110 distributes timing information to each of the slave nodes 120, 130, 140, 150, 160, thereby allowing all nodes in the network to synchronize their operation. Master node 110 may have access to a Stratum 1 reference clock, such that the other nodes in the network synchronize their operation to the clock accessible to master node 110.

More specifically, master node 110 may access an external clock, such as a Global Positioning Satellite (GPS) or an atomic clock. In addition, node 110 may receive a Stratum 1 reference clock from another network element over a Layer 1 interface, such as SONET, T1, or E1/SDH. As a third alternative, master node 110 may itself maintain a highly accurate clock, thereby eliminating the need to retrieve the value from an external clock. After determining the current clock value, master node 110 may generate timing information that specifies the value of the master clock. This timing information may be a numerical value indicating a reference frequency.

After generating the timing information, the master node 110 may communicate the timing information to slave nodes 120, 130, 140, 150, 160 using several alternatives. For each of these alternatives, packets may be sent over a plurality of TDM pseudowires between the master node 110 and the slave nodes 120, 130, 140, 150, 160, as illustrated by the solid lines in FIG. 1. It should be apparent that, in various exemplary embodiments, the plurality of TDM pseudowires also carry data packets.

As a first alternative, master node 110 may explicitly transmit the timing information by forming a packet including the timing information for transmission over the packet-switched network 105. The formation of the packet may be accomplished in any manner, provided that the slave nodes 120, 130, 140, 150, 160 may reliably extract the timing information from the packet.

Thus, the packet may be formed, for example, using the packet format specified in the MEF 8 standard, published by the Metro Ethernet Forum, or the format specified in Request For Comments (RFC) 5086, relating to the Circuit Emulation Service Over Packet Switched Network (CESoPSN). The packet may also be formed according to the format specified in RFC 4553 (Structure-Agnostic Time Division Multiplexing), RFC 4197 (Requirements for Edge-to-Edge Emulation), or RFC 4842 (Synchronous Optical Network/Synchronous Digital Hierarchy Circuit Emulation over Packet). Furthermore, a time stamp may be included in the packet using the format specified in the Real-Time Transport Protocol (RTP), IEEE 1588, or the Network Time Protocol (NTP). Other suitable packet and time stamp formats will be apparent to those of skill in the art.

As a second alternative, master node 110 may implicitly transmit the timing information without including the timing information in a packet. In particular, master node 110 may send packets at regular intervals, such that the slave nodes 120, 130, 140, 150, 160 may determine the appropriate timing information by calculating or otherwise determining the interval between the packets.

It should be apparent that the foregoing description of master node 110 is intended to provide an overview of the functionality of master node 110 in system 100. The internal components of an exemplary master node are described in further detail below with reference to FIG. 2.

In various exemplary embodiments, slave nodes 120, 130, 140, 150, 160 receive the timing packets from master node 110 over the respective TDM pseudowires. Upon receipt of a timing packet, each slave node 120, 130, 140, 150, 160 places the packet in a queue in a manner known to those of skill in the art. Then, each slave node 120, 130, 140, 150, 160 processes the packets in the queue, identifies the timing packets, and derives the timing information, such as the reference frequency, from the timing packets. The derivation of timing information by each slave node 120, 130, 140, 150, 160 may correct the jitter or packet delay variation resulting from the characteristics of packet-switched network 105.

Again, any reliable method of determining the timing information from the packets may be used, provided that the determination accurately recovers the timing information communicated by master node 110. Thus, for example, each slave node 120, 130, 140, 150, 160 may extract the timing information from the packets according to the MEF 8 standard, RFC 4197, RFC 4553, REC 4842, RFC 5086, or any similar method known to those of skill in the art. Alternatively, each slave node 120, 130, 140, 150, 160 may determine the timing information by calculating the interval between timing packets sent by master node 110.

After determination of the timing information, which may be a reference frequency, each slave node 120, 130, 140, 150, 160 uses the timing information to synchronize itself to the clock accessible at the master node 110. Since master node 110 has a highly accurate reference clock, while slave nodes 120, 130, 140, 150, 160 generally have less accurate reference clocks, slave nodes 120, 130, 140, 150, 160 synchronize their timing to master node 110.

In particular, each slave node 120, 130, 140, 150, 160 may run a digital-phase locked loop. In various exemplary embodiments, each digital-phase locked loop sets the operating frequency of the corresponding slave node 120, 130, 140, 150, 160 to the reference frequency received from master node 110, then outputs the current frequency at which the slave node 120, 130, 140, 150, 160 is operating. The detailed operation of an exemplary digital phase-locked loop is described further below with reference to FIG. 5.

After a respective slave node 120, 130, 140, 150, 160 tunes its operation to the reference clock from master node 110, the slave node generates a packet including the frequency outputted by the digital phase-locked loop. Any method of forming the packet may be used, provided that monitoring entity 170 may reliably and accurately extract the frequency from the packet.

Finally, after forming the packet, the respective slave node 120, 130, 140, 150, 160 may send the frequency to the monitoring entity 170. This packet may be sent over one of a plurality of TDM pseudowires between the respective slave node and the monitoring entity 170, as illustrated by the dashed lines in FIG. 1. As with master node 110, slaves nodes 120, 130, 140, 150, 160 may also transmit the frequency by sending packets to monitoring entity 170 at a constant interval.

It should be apparent that the foregoing description of slave nodes 120, 130, 140, 150, 160 is intended to provide an overview of the functionality of the slave nodes in system 100. The internal components of an exemplary slave node are described in further detail below with reference to FIG. 3.

In various exemplary embodiments, monitoring entity 170 is an entity configured to monitor the timing information used by each of the slave nodes 120, 130, 140, 150, 160 and to identify any nodes that are experiencing timing problems. Because monitoring entity 170 receives all frequencies at a central location, monitoring entity 170 may reliably determine whether each slave node 120, 130, 140, 150, 160 is properly synchronized to master node 110. It should be apparent that monitoring entity 170 may be placed in a network element that is a part of network 105. Alternatively, monitoring entity 170 may be a separate unit implemented for the purpose of monitoring timing information.

In operation, monitoring entity 170 may receive the packet including the frequency at which a respective slave node 120, 130, 140, 150, 160 is currently operating, then extract the frequency from the packet. The extraction may be performed in a manner similar to that described above with reference to the receipt of timing packets at the slave nodes 120, 130, 140, 150, 160. In particular, monitoring entity 170 may queue the packets, process packets in the queue to identify timing packets, correct for jitter, then extract the timing information from each packet.

After determining the frequency at which each slave node 120, 130, 140, 150, 160 is currently operating, monitoring entity 170 may run a plurality of digital phase-locked loops, one for each slave node, with each loop sharing the same oscillator. In particular, monitoring entity 170 may run a phase-locked loop for a given slave node using the operating frequency of the slave node as input. Then, monitoring entity 170 may determine the value of a parameter used to adjust the shared digitally controlled oscillator in each phase-locked loop. This parameter could be, for example, an offset value used to adjust the frequency output of the DCO. Because each slave node 120, 130, 140, 150, 160 should be tuned to the same frequency (i.e. the frequency sent by master node 110) and because the loops share a common oscillator, the value of each parameter should, in theory, be identical. Thus, monitoring entity 170 may identify all slave nodes that are currently experiencing timing problems by performing statistical analysis to identify nodes with parameters that are statistical outliers.

As an alternative, monitoring entity 170 may also run a reference phase-locked loop using a Stratum 1 clock as input, while also using the same digitally-controlled oscillator as the loops corresponding to slave nodes 120, 130, 140, 150, 160. Thus, by determining the parameter used to adjust the digitally-controlled oscillator for the reference phase-locked loop, monitoring entity may determine a "correct" value for the parameter. Monitoring entity 170 may then perform statistical analysis in a similar manner, while utilizing the reference value of the parameter.

After identifying slave nodes that are experiencing timing problems, Monitoring entity 170 may implement remedial measures for these nodes. For example, monitoring entity 170 may send a message to operation support system 180 identifying the problematic slave nodes. Alternatively, monitoring entity 170 may notify the operator at OSS 180 or the respective slave node 120, 130, 140, 150, 160 that the slave node should select a new master node 110 from which to receive timing information. Other appropriate remedial measures will be apparent to those of ordinary skill in the art.

In various exemplary embodiments, monitoring entity 170 is the same node as master node 110. Thus, in these embodiments, the plurality of pseudowires between master node 110 and slave nodes 120, 130, 140, 150, 160 are the same as the plurality of pseudowires between slave nodes 120, 130, 140, 150, 160 and monitoring entity 170. Thus, in these embodiments, because the functionality of monitoring entity 170 is implemented in the existing network element, master node 110, cost are lowered and the monitoring capability is more readily available, as master node 110 is already connected to the network. In addition, monitoring entity 170 may be the same network element type of master node 110, thereby allowing easier interoperability and cheaper implementation of monitoring entity 170.

It should be apparent that the foregoing description of monitoring entity 170 is intended to provide an overview of the functionality of monitoring entity 170 in system 100. The internal components of an exemplary monitoring entity are described in further detail below with reference to FIG. 4.

In various exemplary embodiments, operation support system 180 receives one or more messages from monitoring entity 170 identifying slave nodes 120, 130, 140, 150, 160 that are currently experiencing timing problems. Thus, operation support system 180 may provide a user interface from which a network operator may diagnose and/or correct problems in system 100. Operation support system 180 could be, for example, a separate workstation, a web-based interface, or any other system at which an operator may receive notification of problems in the network.

Figure 2:
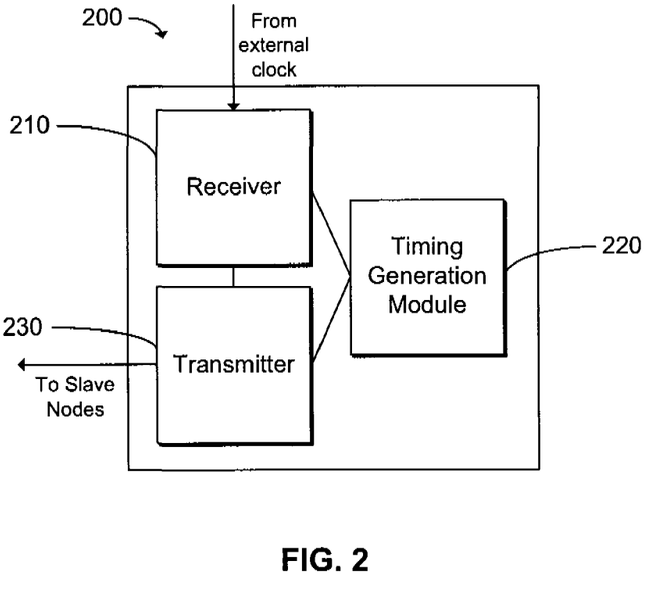
FIG. 2 is a schematic diagram of an exemplary master node for use in the system of FIG. 1.

FIG. 2 is a schematic diagram of an exemplary master node 200 for use in the system 100 of FIG. 1. In various exemplary embodiments, master node 200 includes a receiver 210, a timing generation module 220, and a transmitter 230.

In various exemplary embodiments, receiver 210 is an interface comprising hardware and/or software that is configured to receive timing information from an external clock. Thus, receiver 210 may be in communication with a GPS or an atomic clock, such that master node 200 may serve as a Stratum 1 reference clock.

In various exemplary embodiments, timing generation module 220 comprises hardware, software, or a combination thereof that is used to generate timing information that specifies the value of the master clock. Furthermore, timing generation module 220 may generate a packet including the timing information for transmission over a packet-switched network.

Finally, in various exemplary embodiments, transmitter 230 is an interface comprising hardware and/or software that is configured to send the generated packets to one or more slave nodes over a plurality of TDM pseudowires. Alternatively, transmitter 230 may send packets at a constant interval, such that the receiving node may derive the timing information. Thus, transmitter 230 may comprise a plurality of outgoing ports, one for each pseudowire. It should be apparent, however, that any interface suitable for transmission of data packets may be used.

Figure 3:
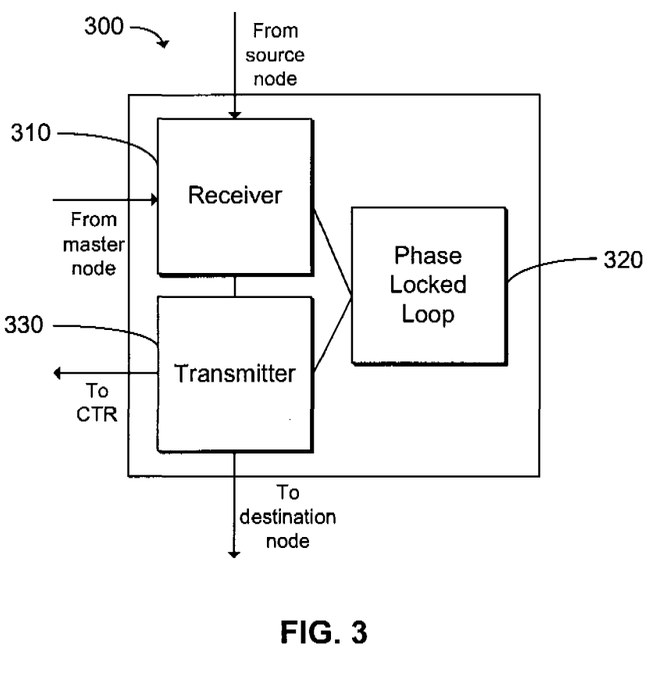
FIG. 3 is a schematic diagram of an exemplary slave node for use in the system of FIG. 1.

FIG. 3 is a schematic diagram of an exemplary slave node 300 for use in the system 100 of FIG. 1. In various exemplary embodiments, slave node 300 includes a receiver 310, a digital phase-locked loop 320, and a transmitter 330.

In various exemplary embodiments, receiver 310 is an interface comprising hardware and/or software that is configured to receive and queue packets. Thus, receiver 310 may be in communication with a source node to receive data packets for forwarding over a packet-switched network. Furthermore, receiver 310 may be in communication with a master node to receive packets specifying the value of a reference clock.

In various exemplary embodiments, digital phase-locked loop 320 is a circuit configured to lock the operating frequency of slave node 300 onto the frequency determined from timing packets received from a master node. Thus, digital phase-locked loop 320 implements the functionality necessary to synchronize the operation of each slave node 300 to the corresponding master node. Digital phase-locked loop 320 may be further configured to output the current frequency at which slave node 300 is operating. The detailed operation of digital phase-locked loop 320 is described further below with reference to FIG. 5.

Finally, in various exemplary embodiments, slave node 300 includes a transmitter 330, which is an interface comprising hardware and/or software that is configured to send packets including the frequency outputted by the digital phase-locked loop 320 to a common reference node over a TDM pseudowire. Transmitter 330 may be further configured to forward packets received from a source node towards a destination node specified in the packet.

Figure 4:
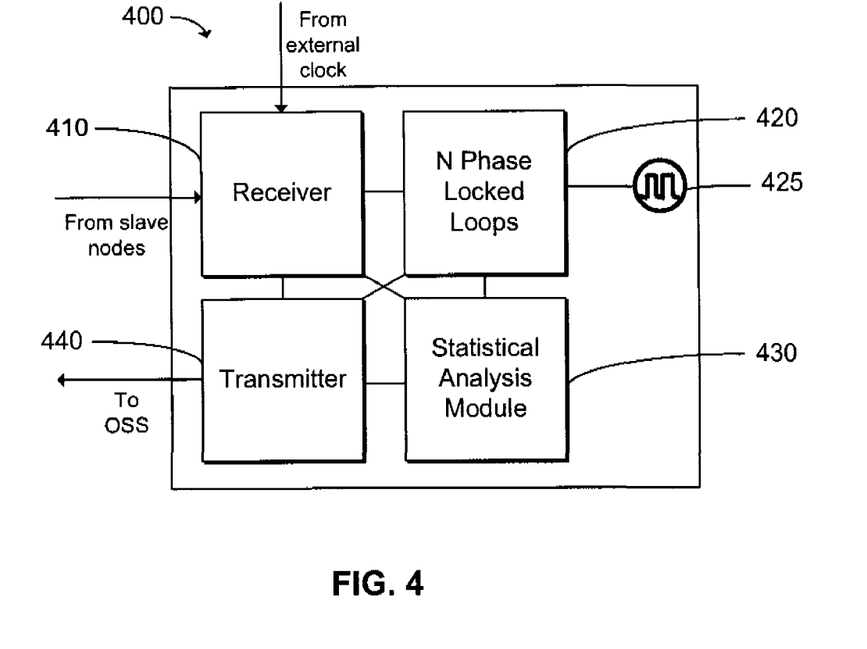
FIG. 4 is a schematic diagram of an exemplary monitoring entity for use in the system of FIG. 1.

FIG. 4 is a schematic diagram of an exemplary monitoring entity 400 for use in the system 100 of FIG. 1. In various exemplary embodiments, monitoring entity 400 includes a receiver 410, N phase locked-loops 420, a shared oscillator 425, a statistical analysis module 430, and a transmitter 440.

In various exemplary embodiments, receiver 410 is an interface comprising hardware and/or software that is configured to receive timing information from an external clock. Thus, receiver 410 may be in communication with a GPS or an atomic clock, such that monitoring entity 400 may reliably determine whether slave nodes are experiencing timing problems. Receiver 410 may be further configured to receive packets including the frequency at which a given slave node is currently operating.

In various exemplary embodiments, monitoring entity 400 includes a plurality of phase-locked loops 420 that share an oscillator 425, with one loop for each slave node that monitoring entity 400 is monitoring. The plurality of phase-locked loops 420 may also include a loop that runs using the shared oscillator 425 and a frequency reference known to be accurate. This frequency reference may be received from an external clock, such as an atomic clock or GPS, as depicted by the arrow labeled "From external clock." Alternatively, this frequency reference may be received over a Layer 1 interface from a network element.

Each phase-locked loop 420 receives two inputs, one indicating the current operating frequency of the corresponding slave node and another from the shared oscillator 425. Each phase-locked loop 420 then runs to determine a parameter used to adjust the shared oscillator 425 for each loop. Again, this parameter may be an offset value used to adjust the frequency output of a DCO.

In addition, in various exemplary embodiments, monitoring entity 400 includes a statistical analysis module 430, which comprises hardware and/or software configured to process values gathered from each of the phase locked-loops 420. In particular, statistical analysis module 430 may collect the parameters from the phase-locked loops 420, then perform mathematical analysis to identify statistical outliers. This analysis could include, for example, calculation of the mean of all parameters, which would give an indication of the frequencies of each of the slave nodes, regardless of the network path taken from the slave node to the monitoring entity. Other forms of statistical analysis will be apparent to those of skill in the art and include, but are not limited to, the standard deviation for each parameter.

As described above, each phase-locked loop 420 runs using a shared oscillator 425 and an operating frequency received from each slave node. Because each phase-locked loop 420 tunes to a frequency provided by the master node and because the loops 420 share a common oscillator 425, the parameter for each loop 420 should, in theory, be identical. More specifically, because a single oscillator 425 is used, differences between oscillators (e.g. temperature differences) are avoided, such that each loop adjusts to the same center frequency.

Thus, by identifying statistical outliers for the parameters, statistical analysis module 430 may determine that the operating frequency of the corresponding slave node is outside of an acceptable range. Acceptable ranges will be apparent to those of skill in the art. For example, a network operator may determine and specify an acceptable error range based on a number of factors including, but not limited to, the guaranteed quality of service and the degree to which the nodes must be synchronized to avoid transmission errors.

Alternatively, as described above, monitoring entity 400 may run a reference instance of the phase-locked loops 420 by inputting the shared oscillator 425 and a frequency reference known to be accurate. The frequency reference known to be accurate could be, for example, a Stratum 1 reference clock received from an atomic clock, a GPS, or a network element over a Layer 1 interface. The parameter derived in this loop may then be assumed to be the "correct" value, such that statistical analysis module 430 may identify nodes that are experiencing timing problems by comparing the parameters for each loop to the reference parameter.

In various exemplary embodiments, monitoring entity 400 also includes a transmitter 440, which is an interface comprising hardware and/or software configured to send information to an operation support system. Thus, transmitter 440 could be configured to send a report identifying all slave nodes experiencing timing problems, raise an alarm in the network, identify slave nodes for which a new master node is required, or transmit any other data needed to implement a remedial measure to address the timing problems.

Figure 5:
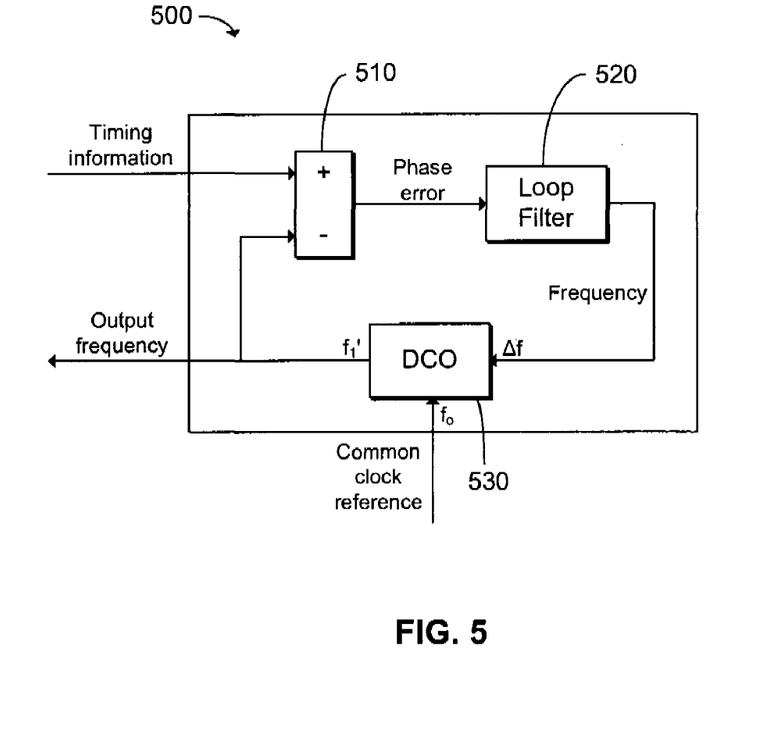
FIG. 5 is a schematic diagram of an exemplary digital phase-locked loop for use in the slave node of FIG. 3 and the monitoring entity of FIG. 4.

FIG. 5 is a schematic diagram of an exemplary digital phase-locked loop 500 for use in the slave node 300 of FIG. 3 and the monitoring entity 400 of FIG. 4. In various exemplary embodiments, digital phase-locked loop 500 includes a phase detector 510, a loop filter 520, and a digitally controlled oscillator (DCO) 530.

Digital phase-locked loop 500 may include a phase detector 510, which compares two input frequencies, one from an external source and one from the output of DCO 530. Thus, when digital phase-locked loop 500 is included in a slave node 300, the phase detector 510 may determine the phase difference between the timing information received from the master node and the output of DCO 530. Alternatively, when digital phase-locked loop 500 is included in a monitoring entity 400, the phase detector may determine the phase difference between the operating frequency of a given slave node and the output of DCO 530. Additionally, when digital phase-locked loop 500 is included in a monitoring entity 400, the phase detector may determine the phase difference between the reference frequency of a given slave node and the output of DCO 530.

Digital phase-locked loop 500 may also include a loop filter 520, which processes the output of phase detector 510 to eliminate noise. Loop filter 520 may average out variations in the output of phase detector 510 over a fixed period of time. Thus, the output of loop filter 520 may be an offset specifying a value used to modify the operation of DCO 530, such that DCO 530 output aligns to the input frequency.

Finally, digital phase-locked loop 500 may include a digitally controlled oscillator 530, which generates a periodic output signal that is fed into phase detector 510. When the frequency of the oscillator differs from the value specified by the common clock reference ($f_0$), the output from loop filter 520 adjusts a parameter specifying a frequency offset ($\Delta f$) of DCO 530, such that DCO 530 outputs a frequency, $f_1'=f_0+\Delta f$. Thus, as the oscillation frequency of DCO 530 becomes unsynchronized with the value of the common clock reference, digital phase-locked loop 500 ensures that DCO 530 locks onto the common clock reference.

Accordingly, a monitoring entity 400 may monitor each of the phase-locked loops for significant alterations in the frequency offset value, $\Delta f$, used to adjust the value used by the DCO 530 to adjust a shared oscillator for each loop. By comparing these values to identify statistical outliers, monitoring entity 400 may identify slave nodes that are experiencing timing problems. Alternatively, as described in further detail above, the monitoring entity 400 may compare each DCO value to a reference DCO value obtained from a loop running using the shared oscillator and a reference frequency known to be accurate.

Figure 6:
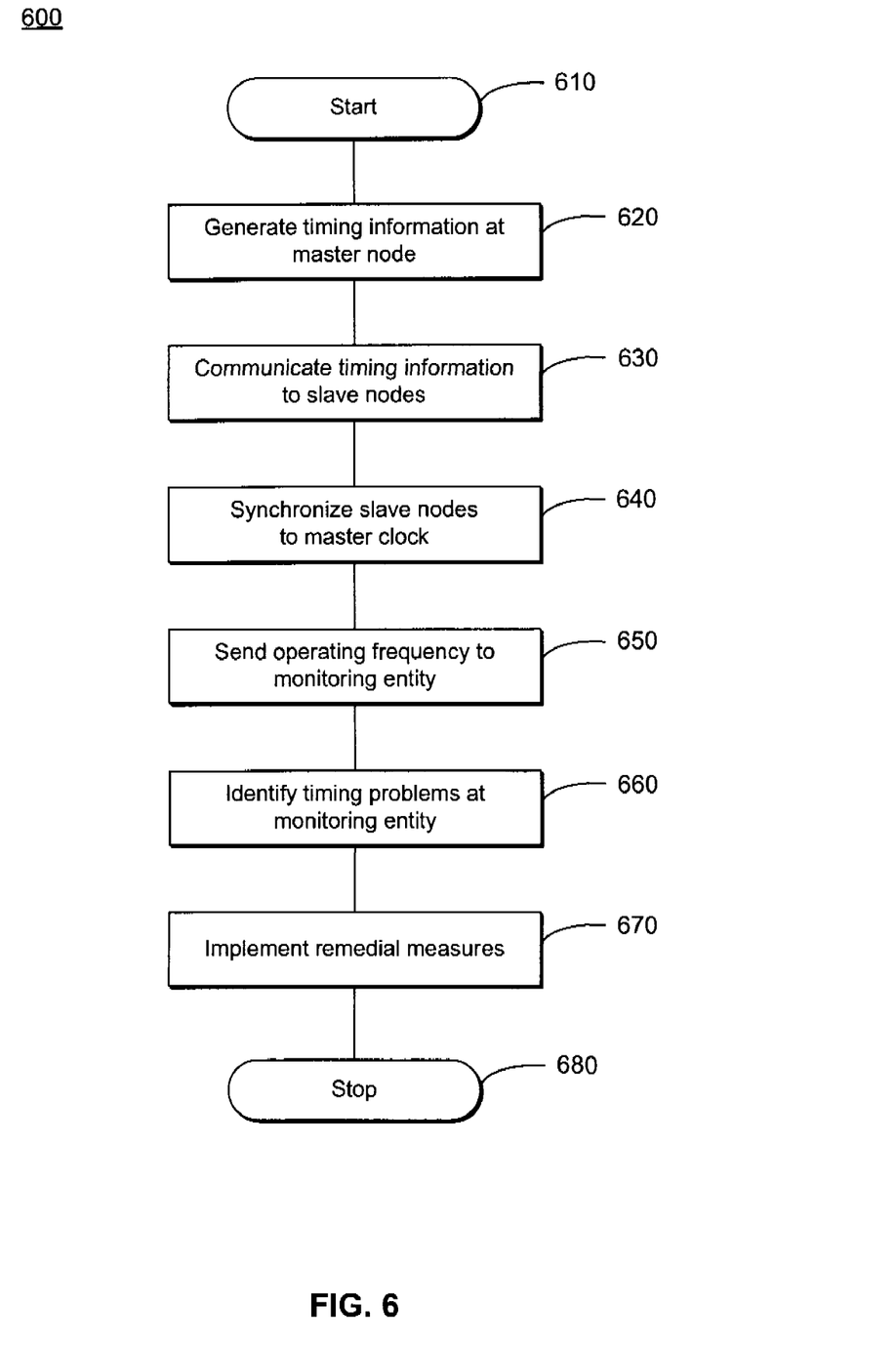
FIG. 6 is a flow chart of an exemplary method for monitoring timing information for packet-based services.

FIG. 6 is a flow chart of an exemplary method 600 for monitoring timing information for packet-based services. Exemplary method 600 may be executed in connection with the components of system 100, as described further above with reference to FIGS. 1-5.

Exemplary method 600 starts in step 610 and proceeds to step 620, where a master node 110 generates timing information indicating the frequency of a clock to which slave nodes 120, 130, 140, 150, 160 in the network should synchronize. In various exemplary embodiments, the master node 110 may retrieve this information from an atomic clock, a GPS, or a highly accurate clock within master node 110 itself.

After generating the timing information in step 620, exemplary method 600 proceeds to step 630, where master node 110 communicates the timing information to each of the slave nodes 120, 130, 140, 150, 160 in the network. As described above, in a first alternative, master node 110 sends a packet including timing information to each of the slave nodes 120, 130, 140, 150, 160 in the network. The packet may in any format, provided that the slaves nodes 120, 130, 140, 150, 160 may reliably and accurately extract the timing information. Alternatively, master node 110 may send packets at a constant rate, such that the rate implicitly indicates the timing information.

Exemplary method 600 then proceeds to step 640, where each of the slave nodes 120, 130, 140, 150, 160 synchronizes its operating frequency to the frequency determined from the timing information sent by master node 110. In particular, each slave node 120, 130, 140, 150, 160 may extract the timing information from the packets or determine the timing information based on the interval between the packets. Each slave node 120, 130, 140, 150, 160 may then process the packets to remove jitter, and feed the frequency into a digital phase-locked loop. Each digital phase-locked loop then locks the operating frequency of the respective slave node 120, 130, 140, 150, 160 onto the frequency extracted from the timing information sent by master node 110 and outputs the current operating frequency.

After synchronizing the slave nodes 120, 130, 140, 150, 160 in step 640, exemplary method 600 proceeds to step 650, where each of the slave nodes 120, 130, 140, 150, 160 generates a timing packet indicating the current operating frequency of the node. Each slave node 120, 130, 140, 150, 160 then sends the timing packet to the monitoring entity 170.

Exemplary method 600 then proceeds to step 660, where monitoring entity 170 identifies timing problems using the frequency values received from each of the slave nodes 120, 130, 140, 150, 160. In particular, monitoring entity 170 includes a plurality of phase-locked loops that share a common oscillator, with one loop for each slave node that monitoring entity 170 is monitoring. Each phase-locked loop receives two inputs, one indicating the current operating frequency of the corresponding slave node 120, 130, 140, 150, 160 and another provided by a shared oscillator. Monitoring entity 170 may also run a phase-locked loop with its inputs set to the common timing reference provided by the shared oscillator and a reference frequency known to be accurate.

Each phase-locked loop then runs to determine a parameter used to adjust the shared digitally controlled oscillator for a given loop. As described in further detail above, monitoring entity 170 may then statistically analyze the parameters to identify statistical outliers and flag the corresponding slave nodes as experiencing timing problems.

Finally, after identifying timing problems, exemplary method 600 proceeds to step 670, where monitoring entity 170 implements remedial measures for the nodes experiencing timing problems. Monitoring entity 170 may send a message to operation support system 180 identifying the problematic slave nodes. Alternatively, monitoring entity 170 may notify the operator at OSS 180 or the respective slave node 120, 130, 140, 150, 160 that the slave node should select a new master node 110 from which to receive timing information. Other appropriate remedial measures will be apparent to those of ordinary skill in the art. Exemplary method 600 then proceeds to step 680, where method 600 stops.

Thus, according to the foregoing, various exemplary embodiments provide a reliable and efficient method, system, and monitoring entity for monitoring timing among nodes in a timing-over-packet system. More particularly, the various exemplary embodiments enable a monitoring node to remotely verify that each slave node in the system is properly synchronized to a master clock, without requiring additional hardware or requiring that a network operator be physically present at the location of the slave node.

It should be apparent that the foregoing description of timing monitoring in the context of TDM pseudowires is only exemplary. Thus, the teachings of this disclosure are equally applicable to any system that implements a timing-over-packet technique using phase-locked loops to synchronize nodes. For example, the teachings of this disclosure could be applied to any system that exchanges timing information according to IEEE 1588, the Network Time Protocol (NTP), or any similar protocol. Other suitable substitutes will be apparent to those of ordinary skill in the art.

It should be further apparent from the foregoing description that various exemplary embodiments of the invention may be implemented in hardware, firmware, and/or software instructions encoded on a machine-readable medium. A machine-readable medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention, Accordingly, the foregoing disclosure, description, and figures are for illustrative purposes only and do not in any way limit the invention, which is defined only by the claims.

What is claimed is:

1. A method for monitoring timing outputs over a packet-switched network, the method comprising:
   generating timing information at a master node in the packet-switched network, the timing information specifying a value of a master clock;
   communicating the timing information from the master node to a plurality of slave nodes;
   running a digital phase-locked loop on each slave node to synchronize each slave node to the master clock, wherein each digital phase-locked loop outputs a frequency at which the respective slave node is operating;
   sending the frequency outputted by each digital phase-locked loop to a monitoring entity over a second plurality of TDM pseudowires;
   utilizing the outputted frequencies at the monitoring entity to identify all slave nodes that are experiencing timing problems; and
   implementing a remedial measure for all slave nodes that are experiencing timing problems.

2. The method for monitoring timing outputs according to claim 1, wherein the monitoring entity is the master node or is of a network element type that is the same as a network element type of the master node.

3. The method for monitoring timing outputs according to claim 1, wherein the step of utilizing the outputted frequencies comprises the following sub-steps:
   inputting the outputted frequency for each slave node into one of a plurality of digital phase-locked loops running on the monitoring entity, wherein each loop corresponds to one of the plurality of slave nodes;
   determining, for each of the plurality of digital phase-locked loops, a parameter used to adjust a digitally-controlled oscillator of each of the plurality of loops, wherein an input into each digitally-controlled oscillator is a common oscillator shared by each of the plurality of the loops;
   analyzing each parameter to identify all parameters that are outside of an acceptable range; and
   for each parameter outside of the acceptable range, identifying the slave node corresponding to the parameter as experiencing timing problems.

4. The method for monitoring timing outputs according to claim 3, further comprising:
   running a reference phase-locked loop that shares the common oscillator and receives, as input, a reference frequency known to be accurate;
   setting a reference parameter equal to a value of a parameter used to adjust a digitally-controlled oscillator in the reference phase-locked loop, the digitally-controlled oscillator in the reference phase-locked loop receiving, as input, the common oscillator; and
   comparing each parameter associated with a slave node to the reference parameter to identify all parameters that are outside of the acceptable range.

5. The method for monitoring timing outputs according to claim 3, wherein the sub-step of analyzing each parameter comprises:
   performing statistical analysis to identify all parameters that are statistical outliers using at least one of a mean of all parameters and a standard deviation for each parameter.

6. The method for monitoring timing outputs according to claim 3, wherein each parameter is an offset value used to adjust the frequency output of the digitally-controlled oscillator.

7. The method for monitoring timing outputs according to claim 1, wherein the remedial measure comprises:
notifying a network operator of all slave nodes that are experiencing timing problems.

8. The method for monitoring timing outputs according to claim 1, wherein the remedial measure comprises:
for each slave node that is experiencing timing problems, selecting a new master node from which the slave node should receive timing information.

9. A system for monitoring timing outputs for packet-based services, the system comprising:
a master node in a packet-switched network, the master node comprising:
a timing generation module that generates timing information specifying a value of a master clock, and
a transmitter that communicates the timing information to slave nodes;
a plurality of slave nodes in the packet-switched network, each slave node comprising:
a digital phase-locked loop that synchronizes the slave node to the master clock, wherein the digital phase-locked loop outputs a frequency at which the slave node is operating, and
a transmitter that sends the frequency outputted by the digital phase-locked loop over a respective TDM pseudowire of a second plurality of TDM pseudowires; and
a monitoring entity in the packet-switched network, the monitoring entity comprising:
a plurality of digital phase-locked loops that share a common oscillator, each of the plurality of loops corresponding to one of the plurality of slaves nodes and receiving the outputted frequency from the corresponding slave node, and
a statistical analysis module that receives a value from each of the plurality of digital phase-locked loops and processes each value to identify all slave nodes that are experiencing timing problems.

10. The system for monitoring timing outputs according to claim 9, wherein the master node and the monitoring entity are the same node.

11. The system for monitoring timing outputs according to claim 9, wherein:
each of the plurality of digital phase-locked loops in the monitoring entity receives, as input, the outputted frequency from the corresponding slave node,
each of the plurality of digital phase-locked loops tunes an operating frequency of the loop to the outputted frequency from the corresponding slave node by adjusting a parameter associated a digitally-controlled oscillator, wherein each digitally-controlled oscillator receives, as input, the common oscillator, and
the statistical analysis module analyzes all parameters from the plurality of digital phase-locked loops to identify parameters that are outside of an acceptable range and, for each parameter outside of the acceptable range, identifies the slave node corresponding to the parameter as experiencing timing problems.

12. The system for monitoring timing outputs according to claim 11, wherein:
each of the plurality of digital phase-locked loops in the monitoring entity further comprises a reference phase-locked loop that shares the common oscillator and receives, as input, a reference frequency known to be accurate, and
the statistical analysis module compares each parameter associated with a slave node to a reference parameter used to adjust a digitally-controlled oscillator in the reference phase-locked loop and thereby identifies all parameters associated with a slave node that are outside of an acceptable range.

13. The system for monitoring timing outputs according to claim 11, wherein the statistical analysis module considers at least one of a mean of all parameters and a standard deviation for each parameter.

14. The system for monitoring timing outputs according to claim 11, wherein each parameter is an offset value used to adjust the frequency output of the digitally-controlled oscillator.

15. The system for monitoring timing outputs according to claim 9, wherein the monitoring entity further comprises:
a transmitter that sends an identification of all slave nodes that are experiencing timing problems to a network operator.

16. The system for monitoring timing outputs according to claim 9, wherein the monitoring entity further comprises:
a transmitter that sends a message to each slave node that is experiencing timing problems, the message indicating that the slave node should select a new master node from which the slave node should receive timing information.

17. A monitoring entity for monitoring timing outputs exchanged between nodes in a packet-switched network, the monitoring entity comprising:
a receiver configured to receive packets from a plurality of slave nodes, the packets specifying an operating frequency of each slave node, wherein each slave node sets the operating frequency using timing information received from a master node;
a plurality of digital phase-locked loops that share a common oscillator, with one loop corresponding to each slave node, wherein:
each of the plurality of digital phase-locked loops receives, as input, the outputted frequency from the corresponding slave node, and
each of the plurality of digital phase-locked loops tunes an operating frequency of the loop to the outputted frequency from the corresponding slave node by adjusting a parameter associated with a digitally-controlled oscillator, wherein each digitally-controlled oscillator receives, as input, the common oscillator; and
a statistical analysis module that analyzes each parameter to identify all parameters that are outside of an acceptable range and, for each parameter outside of the acceptable range, identifies the slave node corresponding to the parameter as experiencing timing problems.

18. The monitoring entity for monitoring timing outputs according to claim 17, wherein:
the plurality of digital phase-locked loops in the monitoring entity further comprises a reference phase-locked loop that shares the common oscillator and receives, as input, a reference frequency known to be accurate, and
the statistical analysis module compares each parameter associated with a slave node to a reference parameter used to adjust a digitally-controlled oscillator in the reference phase-locked loop and thereby identifies all parameters associated with a slave node that are outside of an acceptable range.

19. The monitoring entity for monitoring timing outputs according to claim 17, wherein each parameter is an offset value used to adjust the frequency output of the digitally-controlled oscillator.

20. The monitoring entity for monitoring timing outputs according to claim 17, wherein the statistical analysis module considers at least one of a mean of all parameters and a standard deviation for each parameter.

21. The monitoring entity for monitoring timing outputs according to claim 17, wherein the node further comprises:

a transmitter that sends an identification of all slave nodes that are experiencing timing problems to a network operator.

22. The monitoring entity for monitoring timing outputs according to claim 17, wherein the node further comprises:

a transmitter that sends a message to each slave node that is experiencing timing problems, the message indicating that the slave node should select a new master node from which the slave node should receive timing information.

* * * * *